Patented May 16, 1944

2,348,736

UNITED STATES PATENT OFFICE 2,348,736

FINELY DIVIDED SULPHUR PRODUCT

Sheldon B. Heath, Midland, Mich., assignor to The Dow Chemical Company, Midland, Mich., a corporation of Michigan No Drawing. Application July 24, 1940,
Serial No. 347,297

5 Claims. (Cl. 252—313)

The invention relates to the stabilization of sulphur compositions and is particularly directed to an improved method for the production of finely-divided sulphur products, the particles of which do not tend to reassociate and which are adapted for use as agricultural sprays and dusts.

Many methods have been proposed for the preparation of finely-divided sulphurs. In some the sulphur is mechanically disintegrated in grinders, mills, homogenizers, and the like. Other processes accomplish the subdivision by chemical precipitation. In the several methods common in the art, a wide range of wetting and dispersing agents have been employed as aids in obtaining fine aqueous dispersions of sulphur which, if desired, are subsequently dried and ground to dust. The sulphurs so obtained vary widely in their state of subdivision, some being colloidal in nature and others relatively coarse. A particularly disadvantageous property of many finely-divided products prepared by emulsification methods is the tendency shown by the particles to reassociate and to form agglomerates, which reduces the fungicidal effectiveness and utility of such materials. In applying sulphur, spraying or dusting equipment tends to clog or otherwise to become less efficient in operation when large particles or agglomerates are dispersed in the composition employed. Furthermore, with the present improved dusting machinery, the dust particles are discharged at such a velocity that large granules or agglomerates frequently penetrate or bruise fruit and tender new growth to such an extent as seriously to curtail the marketable crop and interfere with normal tree development.

The problem of preventing the particle growth of sulphur products has been made the subject of numerous scientific investigations. It has been proposed to treat dust compositions with oil or other film-forming material so as to provide a protective coating around each particle. While such methods accomplish the desired result to some degree, the procedures followed greatly increase the cost of production of sulphur sprays and dusts, and the added materials, in certain instances, have contributed to tree injury resulting from the use of the compositions so formed. With the increased use of sulphurs in insect and fungous control, an urgent need arises for an inexpensive and commercially feasible method of preventing a reassociation of particles in sulphur spray and dust compositions.

According to the present invention, finely-divided sulphur, and particularly a material obtained by emulsification procedures, is stabilized against the reassociation of sulphur particles by treatment in aqueous medium with at least 0.5 per cent by weight of sulphite waste liquor product, calculated on the dry basis. This is conveniently accomplished by treating an aqueous suspension of the sulphur with a solution of the sulphite waste liquor or by stirring dried sulphite waste liquor into the sulphur dispersion. The treatment is preferably carried out immediately after the preparation of the sulphur suspension since reassociation of the sulphur particles is rapid under ordinary conditions. The product so obtained may be employed or stored over long periods as a slurry without the formation of agglomerates. If desired, the dispersed sulphur product may be separated after treatment as by filtration and drying, or by evaporation of the water from the crude mixture. The dried residues are then ground to form a dust. Regardless of whether the product is stored as a paste or dust, the individual particles retain their original form and size.

A preferred embodiment of the invention resides in a method for the preparation of finely-divided sulphur involving emulsification and subsequent stabilization, and the product obtained thereby. In this method, molten sulphur is first emulsified with water in the presence of a suitable dispersing agent, rosin, and caustic. Emulsification is carried out in a pressure reactor at temperatures above the melting point of sulphur but below 160° C., and under autogenous pressure. After a coarse emulsion is formed, and without releasing pressure, the product is forced through a colloid mill or other homogenizing device. As the finely-dispersed material is discharged from the milling apparatus, the pressure is quickly released to atmospheric which results in the flashing off of a portion of the water and a reduction of the temperature to below the melting point of the sulphur. The sulphite waste liquor product, either as a finely divided solid or in aqueous solution, is immediately added to the sulphur suspension. The mixture is then stirred for a short time, generally from 15 minutes to 1 hour. The resulting slurry may be used to make sulphur paste, or evaporated to dryness and ground to form a dust.

In carrying out the emulsification, a volume of water at least equal to that of the molten sulphur is employed. The amount of rosin is preferably between 0.5 and 2 per cent of the sulphur to be emulsified. The preferred pH of the mixture is between about 7 and about 8.5. Under such conditions optimum results with respect to stabilization and fineness of dispersion are obtained, and the final product has been found substantially less toxic to growing plants than when more acid or more alkaline conditions are employed. Approximately 1 per cent by weight of solid sodium hydroxide on the basis of the sulphur employed has been found to impart to the emulsion a suitable degree of alkalinity.

The sulphite waste liquor product employed is commercially available either as a solution or finely-divided solid. This product is commonly known as "Goulac." It is very soluble in water and has been found to be substantially harmless to humans and to plant life in the amounts employed. While a minimum of 0.5 per cent of the sulphite waste liquor product has been suggested, up to 2 per cent by weight has been found to give satisfactory results. Amounts in excess of 2 per cent are not harmful but contribute nothing to the desirable characteristics of the ultimate product and result in increased production costs.

The preferred dispersing agent employed in the emulsification step is monobutyl-phenylphenol-sodium-monosulphonate. When sulfur is treated with between 0.5 and about 1 per cent by weight of this dispersing agent and thereafter with sulphite waste liquor in the manner indicated, a superior sulphur product is obtained in the form of a paste or slurry, 50 per cent or more of which remains in aqueous suspension for at least 1 hour after having been dispersed in water. When less than 0.5 per cent of sulphite waste liquor product is employed, the sulphur particles, whether in paste form or dried, tend to reassociate to form agglomerates ranging between 10 and 20 microns in size.

The following example illustrates one embodiment of the invention but is not to be construed as limiting the same:

Example 15 pounds of monobutyl-phenylphenol-sodium-monosulphonate, 10 pounds of finely-divided rosin, and 20 pounds of sodium hydroxide were dispersed in 1300 pounds of water. 2000 pounds of molten sulphur was poured into and emulsified with this aqueous mixture by stirring over a period of one hour at a temperature of 140°–150° C. and under autogenous pressure. The pH of the mixture was 7.8. The resulting emulsion was passed under a pressure of 90 pounds per square inch through a colloid mill. As the fine dispersion of sulphur was discharged from the mill, the pressure was dropped to atmospheric, whereby a portion of the water was flashed off and the temperature of the mixture reduced to below 100° C. which resulted in the solidification of the dispersed sulphur particles. 20 pounds of dried sulphite waste liquor (the commercial product "Goulac") dissolved in 1000 pounds of water was immediately added to the sulphur dispersion, and the mixture stirred for one-half hour, at the end of which time the product consisted of a thick slurry of sulphur particles having an average diameter of from 1 to 2.0 microns. A part of this material was stored wet over a period of several months without developing aggregates of particles as commonly occurs with commercial sulphur products. A portion of the slurry was mixed with bentonite to form a thick paste which was readily dispersible in water and did not tend to form agglomerates. A further portion of the product was dried at temperatures of 90°–120° C. and ground to obtain a finely-divided free-flowing sulphur product, wetting readily with water, and in which the particles showed no tendency to grow on storage.

The emulsified and homogenized product described above was sampled prior to treatment with the sulphite waste liquor solution. This material showed appreciable particle growth within 2.5 hours with the formation of aggregates of from 15 to 20 microns diameter.

While the foregoing example discloses the use of the preferred dispersing agent monobutyl-phenylphenol-sodium-monosulphonate, other dispersing agents may be substituted therefor to obtain sulphur products which do not tend to form aggregates. Representative of such materials are sodium-alkyl-naphthalene-sulphonate, monobutyl-diphenyl-sodium-sulphonate, dibutyl-phenyl-phenol-sodium-disulphonate, naphthalene-sulphonic acid, sodium-lauryl-sulphate, and the like.

I claim:

1. A process for preparing finely-divided sulphur, the particles of which do not tend to reassociate on storage, which comprises the steps of emulsifying liquid sulphur with at least an equal volume of water in the presence of monobutyl-phenylphenol-sodium-monosulphonate and rosin at a pH of between 7 and 8.5 at a temperature above the melting point of sulfur and below 160° C. and under autogenous pressure, passing the emulsion through a homogenizer at the elevated temperature and pressure, reducing the pressure on the product as it is discharged from the homogenizer to flash off a portion of the water and lower the temperature of the mixture so as to solidify the sulphur particles, and immediately treating the dispersion with sulphite waste liquor product in the amount of at least 0.5 per cent by weight of the sulphur calculated on a dry basis.

2. A process for preparing finely-divided sulphur, which comprises the steps of emulsifying liquid sulphur with at least an equal volume of water in the presence of monobutyl-phenylphenol-sodium-monosulphonate, rosin, and sodium hydroxide in the amount of 1 per cent by weight of the sulphur under autogenous pressure and at a temperature above the melting point of sulphur and below 160° C., passing the emulsion through a homogenizer at the elevated temperature and pressure, reducing the pressure on the product as it is discharged from the homogenizer to flash off a portion of the water and lower the temperature of the mixture so as to solidify the sulphur particles, and immediately treating the dispersion with sulphite waste liquor product in the amount of at least 0.5 per cent by weight of the sulphur calculated on a dry basis.

3. A process for preparing finely-divided sulphur, which comprises the steps of emulsifying liquid sulphur with at least an equal volume of a water solution comprising monobutyl-phenylphenol-sodium-monosulphonate, between 0.5 and 2 per cent by weight of rosin, and 1 per cent by weight of sodium hydroxide, both by weight of the sulphur, at a temperature above the melting point of sulphur and below 160° C. and under autogenous pressure, passing the emulsion through a homogenizer at the elevated temperature and pressure, reducing the pressure on the product as it is discharged from the homogenizer to flash off a portion of the water and lower the temperature of the mixture so as to solidify the sulphur particles, and immediately treating the dispersion with an aqueous solution of sulphite waste liquor product in the amount of at least 0.5 per cent by weight of the sulphur calculated on a dry basis.

4. A process for preparing finely-divided sulphur, which comprises the steps of emulsifying liquid sulphur with at least an equal volume of a water solution comprising by weight of the sulphur between 0.5 and 1 per cent monobutyl-phenylphenol-sodium-monosulphonate, 0.5 per cent rosin, and 1 per cent of sodium hydroxide at 140°–150° C. and under autogenous pressure, passing the emulsion through a colloid mill under a pressure of 90 pounds per square inch and at a temperature above the melting point of sulphur, reducing the pressure on the product as it is discharged from the colloid mill to flash off a portion of the water and to lower the temperature of the mixture so as to solidify the sulphur particles, and immediately treating the dispersion with an aqueous solution of sulphite waste liquor product in the amount of 1 per cent by weight of the sulphur calculated on the dry basis.

5. A process for preparing finely-divided sulphur, the particles of which do not tend to reassociate on storage, which comprises the steps of emulsifying liquid sulphur with at least an equal volume of water in the presence of rosin and a dispersing agent selected from the group consisting of alkali metal aromatic sulphonates and alkali metal long-chain alkyl sulphates at a pH of between 7 and 8.5 at a temperature above the melting point of sulphur and below 160° C. and under autogenous pressure, passing the emulsion through a homogenizer at the elevated temperature and pressure, reducing the pressure on the product as it is discharged from the homogenizer to flash off a portion of the water and lower the temperature of the mixture so as to solidfy the sulphur particles, and immediately treating the dispersion with sulphite waste liquor product in the amount of at least 0.5 per cent by weight of the sulphur calculated on a dry basis.

SHELDON B. HEATH.